United States Patent
Bryant et al.

(10) Patent No.: US 10,846,990 B2
(45) Date of Patent: *Nov. 24, 2020

(54) METHOD OF SELECTING ELECTRONIC GAME

(71) Applicant: Aristocrat Technologies Australia Pty Limited, North Ryde (AU)

(72) Inventors: Natalie Bryant, Cherrybrook (AU); Kevan Rush, Hunters Hill (AU); Kenneth Mark Upton, Mona Vale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,127

(22) Filed: Mar. 26, 2019

(65) Prior Publication Data
US 2019/0221077 A1    Jul. 18, 2019

Related U.S. Application Data

(63) Continuation of application No. 15/477,636, filed on Apr. 3, 2017, now Pat. No. 10,242,534.
(Continued)

(51) Int. Cl.
| | |
|---|---|
| *G07F 17/32* | (2006.01) |
| *G06F 3/01* | (2006.01) |
| *G06F 3/041* | (2006.01) |
| *G06F 3/0481* | (2013.01) |
| *G06F 3/0484* | (2013.01) |

(Continued)

(52) U.S. Cl.
CPC .......... *G07F 17/3262* (2013.01); *G06F 3/017* (2013.01); *G06F 3/041* (2013.01); *G06F 3/04817* (2013.01); *G06F 3/04842* (2013.01); *G06F 3/04883* (2013.01); *A63F 9/24* (2013.01)

(58) Field of Classification Search
USPC .......................... 463/1, 5, 16, 17, 20, 22, 39
See application file for complete search history.

(56) References Cited

U.S. PATENT DOCUMENTS

| | | |
|---|---|---|
| 8,002,623 B2 | 8/2011 | Resnick et al. |
| 8,147,340 B2 | 4/2012 | Brunet de Courssou et al. |

(Continued)

OTHER PUBLICATIONS

Australian Government, IP Australia, Examination report No. 1 for standard patent application, application No. 2018200351, dated Sep. 20, 2019, 6 pages.

*Primary Examiner* — Adetokunbo O Torimiro
(74) *Attorney, Agent, or Firm* — McAndrews, Held & Malloy, Ltd.

(57) ABSTRACT

A gaming machine is configured to play one of a plurality of games. The gaming machine includes a display including a first display area, a second display area, and a third display area. A game controller executes instructions to display on the first display area a carousel of first representations of a plurality of games and display on a second display area second representations of the plurality of games, and, in response to receipt of a first input, display a rotation of the first representations in the carousel in the first display area, display a plurality of selectable denominations in the third display area, and in response to receipt of a second input with respect to a selected representation of the first representations in the carousel, highlight a second representation of the second representations corresponding to the selected representation.

20 Claims, 15 Drawing Sheets

Related U.S. Application Data

(60) Provisional application No. 62/316,801, filed on Apr. 1, 2016.

(51) Int. Cl.
*G06F 3/0488* (2013.01)
*A63F 9/24* (2006.01)

(56) References Cited

U.S. PATENT DOCUMENTS

| | | |
|---|---|---|
| 8,602,896 B2 | 12/2013 | Brunet de Courssou et al. |
| 9,355,522 B2 | 5/2016 | Wood et al. |
| 2006/0287058 A1 | 12/2006 | Resnick et al. |
| 2010/0227689 A1 | 9/2010 | Brunet de Courssou et al. |
| 2010/0227690 A1 | 9/2010 | Brunet de Courssou et al. |
| 2010/0267449 A1 | 10/2010 | Gagner et al. |
| 2011/0159956 A1 | 6/2011 | Itskov et al. |
| 2014/0004961 A1 | 1/2014 | Brunet de Courssou et al. |
| 2014/0256409 A1 | 9/2014 | Wood et al. |
| 2016/0092065 A1 | 3/2016 | Hilbert et al. |

METHOD OF SELECTING ELECTRONIC GAME

RELATED APPLICATIONS

The present application is a continuation of U.S. patent application Ser. No. 15/477,636, filed Apr. 3, 2017, entitled "METHOD OF SELECTING ELECTRONIC GAME", which claims benefit from and priority to U.S. Provisional Patent Application Ser. No. 62/316,801, having a filing date of Apr. 1, 2016, entitled "METHOD OF SELECTING ELECTRONIC GAME." Each of the above-mentioned applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD

The present invention relates to gaming machines and methods of gaming, and more particularly to gaming systems having an interface where a plurality of different games are playable and the player has a choice as to which game or games to play.

BACKGROUND

With the increase of gambling at gaming venues has come increased competition between such gaming venues to obtain a larger share of the total gambling spend. Gaming venue operators have therefore continuously looked for new variations and types of games in order to attract both new and returning customers to their venues. Many slot style gaming machines look and function similarly. Thus there exists a need to develop enticing interfaces that attract consumers to a gaming venue's gaming systems.

Game venue operators strive for players stay at a gaming system for maximum amount of time while still enjoying that particular game. Thus, when player becomes tired of one game, it is important for the player to be able to switch to a different game without leaving the gaming system and therefore extract maximum entertainment from the gaming system. Gaming venue operators may directly benefit by providing games to players that entertain the players and therefore there is a need for providing games that entertain the largest number of players.

Therefore, there is a need to provide multiple ways to ensure maximum enjoyment of gaming machines. One way is to provide new and interesting gaming systems that look and function like something that exists in the world that a player has a positive emotional connection to. Another way of providing maximum enjoyment is to allow the selection of multiple games from the same gaming system. A third way of increasing the enjoyment of a gaming system is to provide bonus games which are triggered by various events and therefore keep the player interested in the gaming system. The bonus game may be activated either randomly or when a particular gaming outcome occurs during a main game. While the player is playing the bonus game, the main game is suspended. The main game resumes after the player finishes playing the bonus game.

Any reference in this specification to the prior art does not constitute an admission that such prior art was well known or forms part of the common general knowledge in any jurisdiction.

BRIEF SUMMARY

In a first aspect, a gaming system implements a game wherein at least one symbol is selected and presented, the gaming system comprising:

a user interface and a display in communication with a game controller that controls the presentation of images on the display at least partly in response to a user operation of the user interface; wherein the gaming machine is arranged to detect a user input and in response to the detection of the user input initiates a process that causes the gaming machine to provide at least one main game relating to the information presented on the display and correlating to the input detected; and wherein the interface comprises at least a first and a second selection mechanism for each game, such that a user selection using the first selection mechanism triggers a visual interaction of the user second selection mechanism and the user selection using the second selection mechanism triggers a visual interaction of the user with the first selection mechanism.

The display may be a touch-operated display adapted to receive the user input wherein the user input is made by a user selecting by touch one or more of the images displayed on the display.

The gaming system may be configured to play at least two main games.

The first selection mechanism may comprise a carousel and at least two images carried by the carousel. The two images relate to respective different main games. The carousel is adapted to detect a user input such that the carousel spins clockwise in response to a first user input and spins counterclockwise in response to a second user input.

The gaming system may be adapted to initiate at least one main game by a user input of either the first selection mechanism or the second selection mechanism.

Alternatively, the gaming system may be adapted to initiate at least one main game by a user input via only the first selection mechanism but where the second selection mechanism provides additional information about at least one main game correlating to the input detected in the first selection mechanism.

The gaming system and user interface may be designed to appear as a jukebox.

The gaming system may additionally comprise a bonus game that is initiated by a trigger in at least one main game, wherein the bonus game has an interface that transitions from an icon in the user interface and overlays the display of the at least one main game.

Alternatively, the gaming system may further comprise a bonus game that is triggered randomly and independent of at least one main game, wherein the bonus game has an interface that transitions from an icon in the user interface and overlays the display of the main game.

The color of the user interface and gaming system may be determined by which game is selected. Additionally, each game may have at least two identifying colors.

According to a second aspect of the invention, there is provided a method for use with a gaming system arranged to play at least one game in which symbols are selected and presented on a game display, the method comprising:

presenting information relating to at least two games on a display;

receiving at a player interface a predefined first input; and in response to receipt of said first input, initiating a first gaming session on the gaming system in which a first game is played wherein at least one award is tracked.

The method may further comprise;

a unique symbol displayed discreetly while the first game is initiated, receiving a predefined second input;

in response to receipt of said second input, displaying a player interface providing information relating to at least two games on a display while retaining the award tracked from the first game.

The method may further comprise:

receiving at a player interface a predefined third input; and in response to receipt of said third input, initiating a second gaming session on the gaming system in which a second game is played wherein the award tracked is carried over from the first game.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

Figure 1:
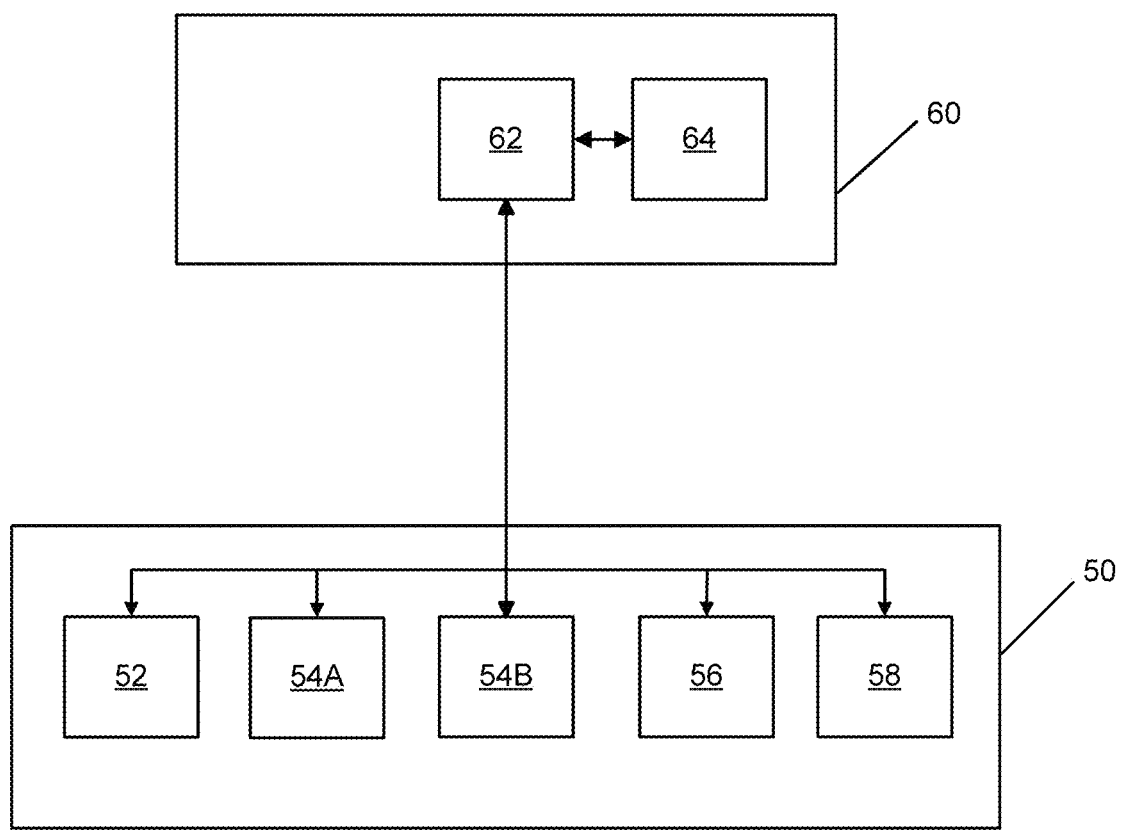
FIG. 1 is a block diagram of the core components of a gaming system.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the gaming system.

DETAILED DESCRIPTION

In the following detailed description, numerous specific details are set forth in order to provide a thorough understanding of the present embodiments. However, it will be clear to one skilled in the art when the present invention can be practiced without some or all of these specific details. In other instances, well-known features or processes may not be described in detail so as not to unnecessarily obscure the invention. In addition, like or identical reference numerals may be used to identify common or similar elements.

The present disclosure relates to a gaming system that can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54A, 54B, a game play mechanism 56 including one or more input devices that enable a player to input game play instructions (e.g. to place a wager), and one or more speakers 58.

The game controller 60 is in data communication with the player interface 50 and typically includes a processor 62 that processes the game play instructions in accordance with game play rules and outputs game play outcomes to one or more of the displays 54A, 54B. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is, a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
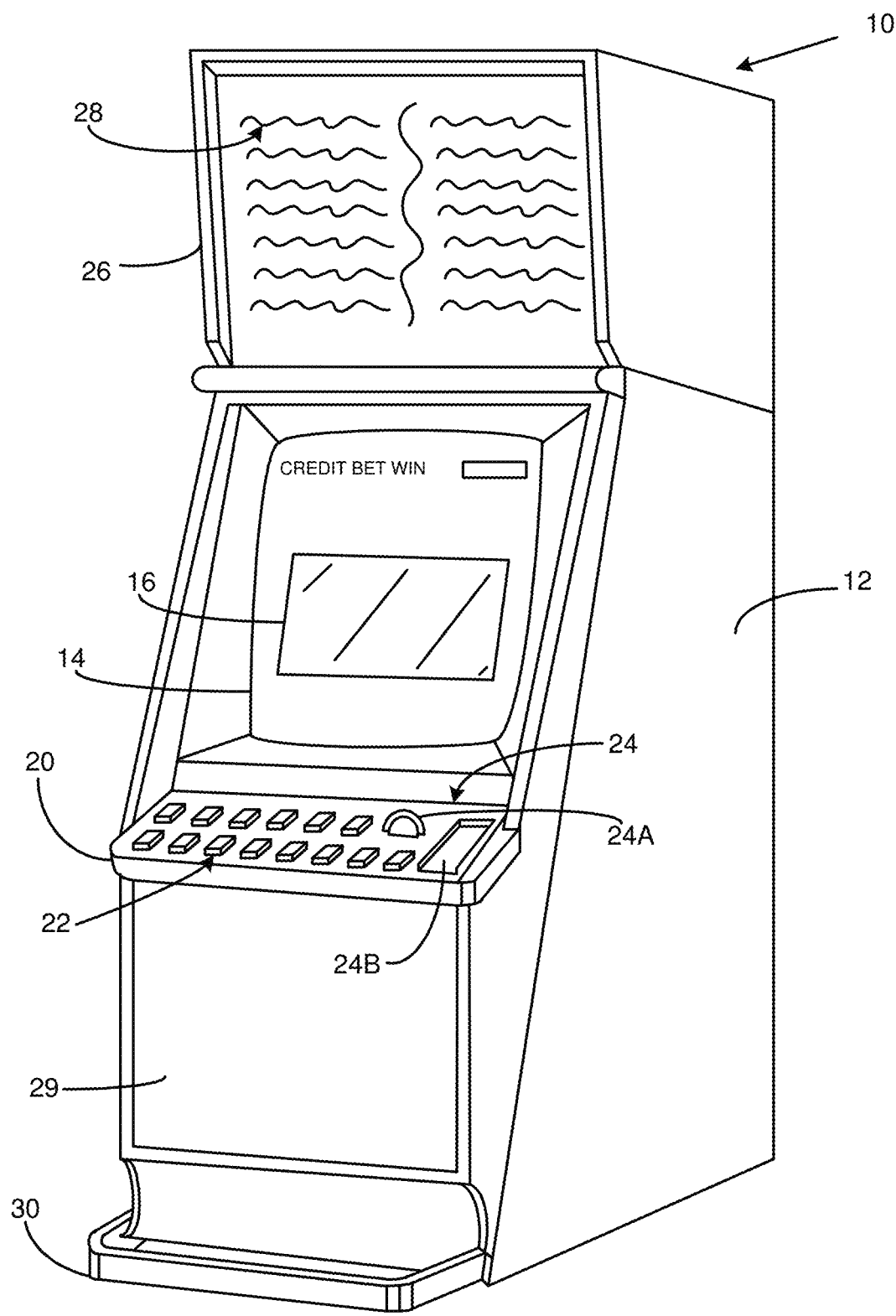
FIG. 2 is a perspective view of a standalone gaming machine.

Referring to FIG. 2, a gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which receives input from the player in order to establish a credit balance, the credit balance increases and decreases based at least on wagering activity. Credit input mechanism 24, in this example, includes a coin input chute 24A and a bill collector 24B. Other credit input mechanisms may also be employed, for example, a card reader for reading a smart card, debit card or credit card. Other gaming machines may be configured for ticket input such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

Display 14 shown in FIG. 2 is in the form of a video display unit, such as a liquid crystal display. Alternatively, display 14 may be a cathode ray tube screen device, a plasma screen, or any other suitable video display unit, or the visible portion of an electromechanical device.

Figure 3:
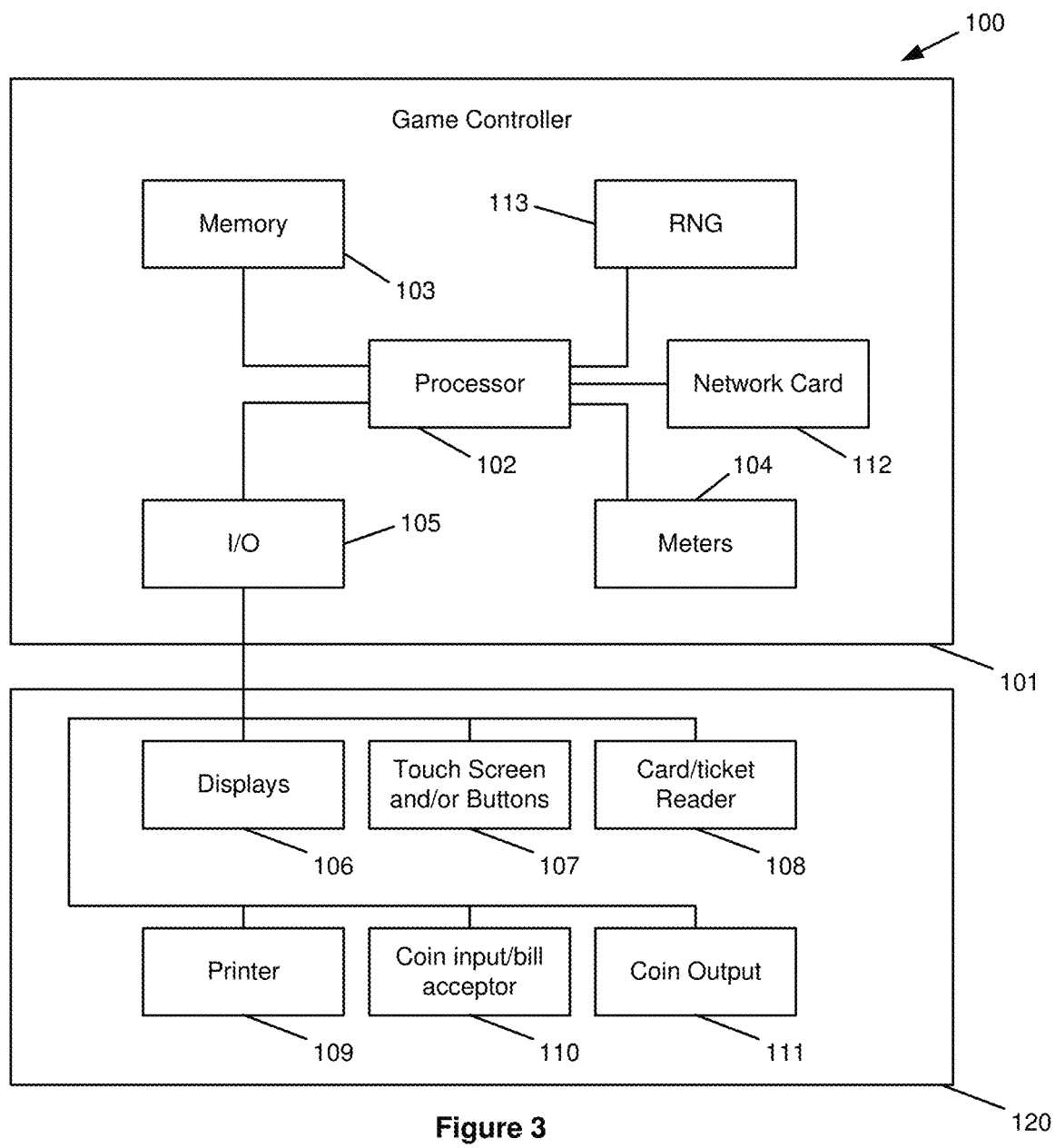
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle may be used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
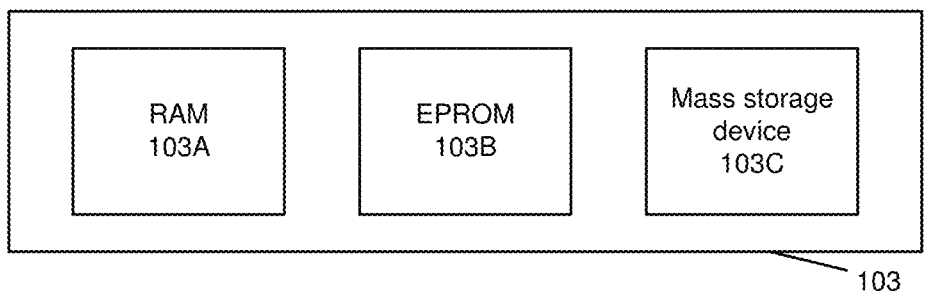
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed. For example, input/output devices 106, 107, 108, 109, 110, 111 may be provided remotely from the game controller 101.

Figure 5:
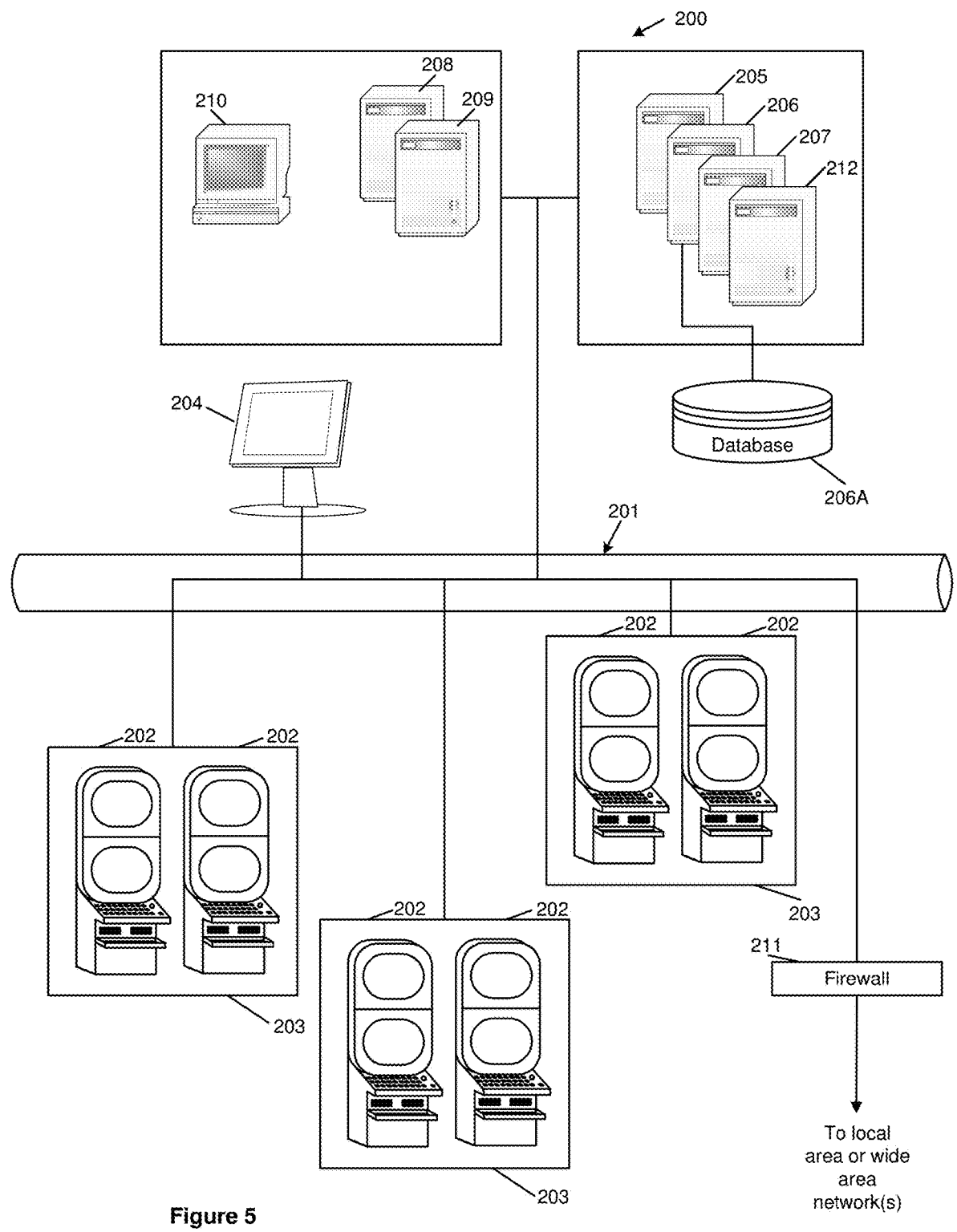
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Figure 6:
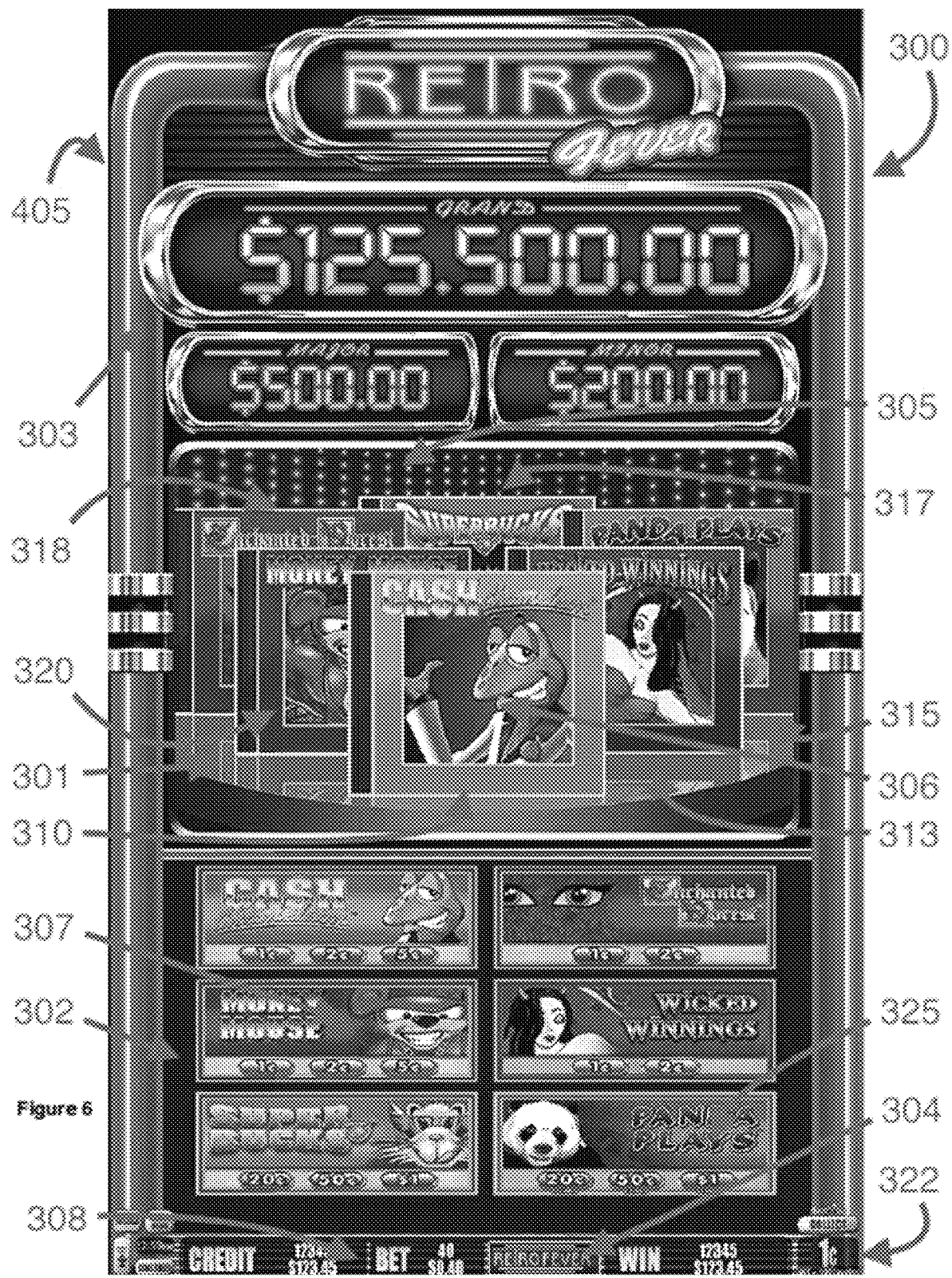
FIG. 6 is a mockup of the interface jukebox lobby

Referring now to FIG. 6, a display screen 300 forms part of the user interface and is configured to mimic the appearance of a jukebox. For example, the perimeter of screen 300 may comprise a simulated neon light band 303, often found in jukeboxes. Light band 303 is changeable in color according to which game is selected by a player. Neon band 303 may be an animation presented on display screen 300, or may be formed as a separate physical component of the machine.

Figure 7:
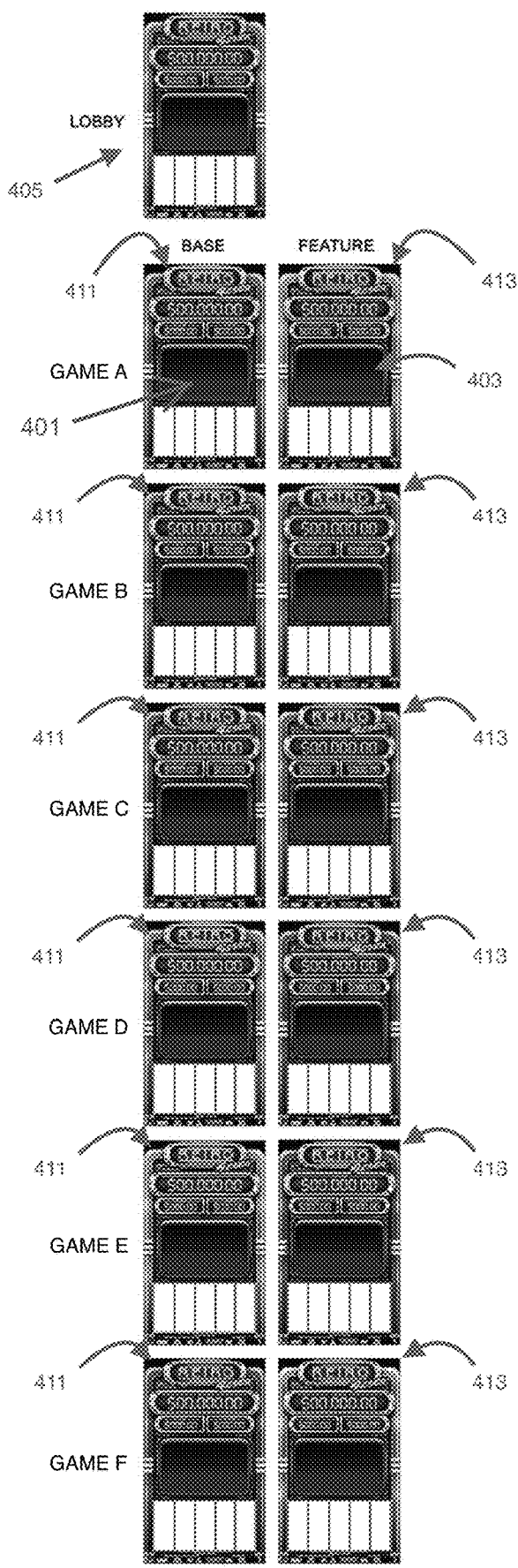
FIG. 7 is a mockup of the interface's various colors

As shown in FIG. 7, six different games (GAME A, GAME B, GAME C, GAME D, GAME E, and GAME F) are selectable by the player to be played. Each game has a display screen 411 for a main game, and a separate display screen 413 for an associated feature game. Each game has a main game color 401 (shown as purple for GAME A in the FIG. 7) and a different feature color 403 (shown as green for GAME A in FIG. 7). A jukebox lobby (or entrance screen display) 405 is presented to enable the user to initially select one of the six games for play. Each game may have its own separate identifying color as shown in FIG. 7.

Persons skilled in the art will appreciate that such a novel interface is designed to attract players because it is both visually appealing and entertaining by itself. By giving the appearance of something that many players have either used or at least seen, the gaming system and interface's appearance may trigger some subjective positive emotional response in the player, which encourages the player to engage with the gaming system.

Referring again to FIG. 6, the jukebox lobby display screen 405 may be split into two sections: an upper carousel selection section 301 and a lower tile selection section 302. Alternatively, the jukebox lobby display screen 405 may consist of only the carousel selection section 301. Upper carousel selection section 301 is configured as a carousel 305. Carousel 305 comprises a plurality of Game CDs (compact disks) 306. Each Game CD 306 has an appearance of a conventional CD jewel case, and represents a different game that is selectable by the player. The Game CD 306 may include a picture and a name, both of which being associated with its respective game. The player can touch the display screen 300 in a swiping action to cause carousel 305 to visually rotate in the direction of the swipe in order to selectively present a Game CD 306 at a front position 310 of the carousel. That is, the player uses his/her finger, for example, in a sliding touching action across the display screen sideways to rotate the carousel causing it to visually spin and stop. As understood by persons skilled in the art, touch display screens may function in this was by sensing the sliding movement of the finger and responsively moving the displayed figure accordingly.

Each Game CD 306 may be spun into the front position 310 of the carousel. For example, the Cash Chameleon Game CD is shown at the front position 310 in FIG. 6. Once a Game CD 306 is moved into the front position 310 of carousel 305, the player may directly touch the Game CD 306 (now located in the front position) to select the game identified by that Game CD 306. The carousel 305 may be adapted to spin smoothly or spin incrementally, pausing whenever a new game CD 305 rotates into the front position 310. The direct touch for selection may be a tap of the finger directed into display screen 300 as compared to a finger swipe moving sideways along the face of display screen 300.

Once the game is selected for play, the gaming machine may also offer denomination selection. In the lower tile selection section 302, there may be an additional selection area which provides additional information about each game. Tile section 302 consists of a matrix of six game tiles 307. Each game tile 307 displays the name of a specific game, a picture related to the specific game, and information. The information may relate to specifics of the game and may include a selection area 308 for providing denomination selection in regard to betting for game play. Several denomination values are shown, e.g., 1 cent, 2 cents and 5 cents are shown in the Cash Chameleon selection area 308. Each denomination value is surrounded by a small elongated area that is touch actuable to select the denomination identified in the area. The values are shown for selection to define the value of a credit, i.e., the game denomination.

In one embodiment, a player may initiate any one of the six games by either (1) a selection at the upper carousel section 301 or (2) by selection at the lower tile section 302. Selection on the upper section 301 is as described above using the carousel 305; whereas, selection on the lower tile section 302 may be performed by direct touch (tapping into the screen display) at the particular tile 307 or at a denomination value in area 308. Alternatively, the selection in the lower tile section 302 may be performed by first touch-selecting the tile 307 and thereafter touch-selecting the denomination area 308.

Once a selection is made, carousel 305 and tiles 307 are removed from the display, i.e., the lobby display 405 of FIG. 7 is removed, and replaced with a game display screen 411 (one of GAME A, GAME B, GAME C, GAME D, GAME E, GAME F shown in FIG. 7). The player then plays the game in a normal fashion. This embodiment is not limited to six games. For example, only a section of the carousel 305 may be visible at a time, so that game CD's 306 can spin off of the sides of the screen when the carousel 305 rotates. As the game CD's spin off the sides, the game tiles 307 in the tile section 302 shift accordingly. Thus if the carousel 305 presents game CD's 306 for Games A-F, two columns of game tiles 307 present corresponding information to Games A-F. The first column presenting, from top to bottom, Games A-C, and the second column presenting, from top to bottom, Games D-F. If a player spins the carousel 305 so that game CDs 306 D-I are presented, the two columns of game tiles 307 shifts to present Games D-I. The first column presenting, from top to bottom, Games D-F, and the second column presenting, from top to bottom, Games E-I. This embodiment is not limited to only presenting six games at a time. Any even or odd number of games presented would use the same system as described above.

In a second embodiment, the upper carousel selection section 301 is the only mode of game selection while the lower game tile section 302 is reserved to provide additional information about the game to the player. As the player spins carousel 305, each Game CD 306 is moved to the front position 310 of the carousel 305. When a Game CD 306 is moved to the front position 310, its corresponding game tile 307 is identified visually by the placement of a yellow border (not shown) surrounding the tile 307. Identifying devices other than a yellow border may be used to highlight the game tile 307 corresponding to the Came CD 306 located in the front position 310.

The player may thus spin the carousel and stop it with a specific game CD 306 at the front position 310, but before the selection is made. The player may want to "read up" on the game since it is new to him, and so looks down to the lower tile section 301 and finds the information quickly since it will have a yellow border around the tile 307 corresponding to the game CD 306 at the front position 310. In such a second embodiment in which game selection does not occur at lower tile section 302, selection of the game denomination may still occur at tile selection 302. Further, tapping on a tile 307 outside of denomination area 308, may cause additional game information (not shown) to be displayed to the player on tile 307 as regards to the specific game.

In the second embodiment, the upper carousel section 301 and lower tile section 302 of the jukebox lobby are synchronized. When the carousel 305 is scrolled, the highlight of a yellow border will move in correspondence with the scrolling of the carousel 305. For example, when scrolling the Game CD carousel 305 clockwise, starting with Game A and moving from Game A to Game F, the highlight in the lower tile section 302 will move accordingly from Game A to Game F.

The reverse may also be true in a third embodiment. In such a third embodiment, the player selects a game, e.g., Game D, on the lower tile section 302. The carousel 305 will then automatically rotate so that the Game CD 306 that identifies Game D moves to the front position 302 of the carousel.

Alternatively, in a fourth embodiment, the carousel selection section 301 is the only mode of game selection. In this embodiment, the lobby display 405 consists only of the carousel selection section 301. Persons skilled in the art would appreciate that such an embodiment would allow players to choose from a significant number of games without being limited to the size of the display 300. The size of the carousel 305 can be increased to fit as many titles as gaming venue chooses. Rather than presenting all game CD's 306 at once, the carousel selection section may be animated such that only a section of the carousel 305 is visible at a time so that game CD's 306 can spin off of the sides of the screen when the carousel 305 rotates.

In one embodiment, when a game is selected, the Game CD 306 (located in the front position 310 of the carousel) may be shown to open and the CD removed from the case. An animation shows the CD case of the selected game being retrieved from the carousel, expanding, opening and a CD being taken out of the case. The CD is then half embedded into a platform above the game reels. Thereafter the game starts.

Game CD carousel 305 may present more than six Game CDs 306. As seen in FIG. 6, the Cash Chameleon Game CD is located at front position 310 of the carousel. As carousel 305 rotates counterclockwise, the Cash Chameleon Game CD move to position 313 and then to position 315. However, different from the above described embodiment, the Cash Chameleon Game CD does not move into the back position 317, but disappears off of the display screen 300. Back position 317 is not used to display a Game CD, i.e., there is no Game CD shown in back position 317. As the carousel 305 rotates, a new Game CD (not shown) appears in display position 318. That is, as the Game CD formerly occupying display position 318 moves into display position 320, a new Game CD (not shown) moves into display position 318. Thus, Game CDs move off of the display screen from position 315 and new Game CDs move onto the display screen at position 318. Thus, selection of a Game CD may be made from more than six Game CDs, while providing a carousel selection.

An attract mode is provided in which carousel 305 is spun in order to attract players to the gaming machine. Carousel 305 spins to place a Game CD into front position 310, for a short period of time, thus displaying the game available. Thereafter, carousel 305 is rotated to move another Game CD into the front position 310 for a short period of time. Thus, each game is shown on the display periodically.

Persons skilled in the art will appreciate that the described multi-selection interface has multiple advantages. First, the interaction between the upper carousel selection section 301 and lower tile selection section 302 provides for further enjoyment and excitement for players who have used or seen a jukebox. Such a strong emotional appeal may draw more players to gaming system described in this embodiment. Second, the interaction gives the player a second look or decision, allowing the player to go back to the lower tile selection method to choose something else instead of playing or selecting the first game choice.

Referring again to FIG. 6, the interface may also exhibit a logo 304 on display screen 300 bearing the name of the gaming system, e.g., the logo RETROFEVER, as shown in FIG. 6. Logo 304 appears along the bottom of the display screen, as shown in FIG. 6, and forms part of a general information horizontal display ribbon 322. Logo 304 will also occur at the bottom of the display screen for each of GAME A, GAME B, GAME C, GAME D, GAME E and GAME F.

Figure 8:
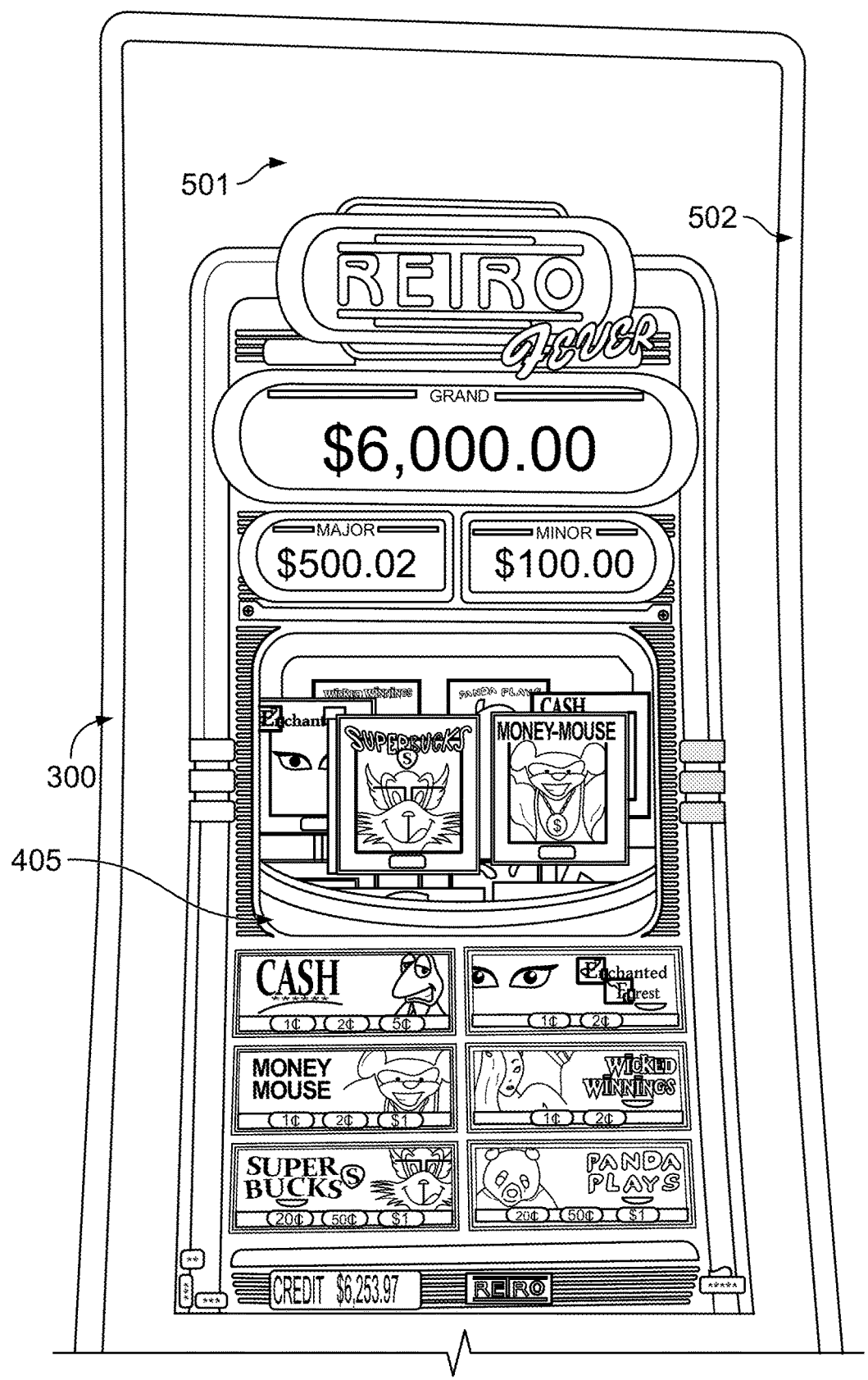
FIG. 8 is a mockup a gaming system showing the interface jukebox lobby

FIG. 8 shows jukebox lobby display screen 405 placed on gaming machine display 300. The gaming machine display may have a black background 501, which may be visible around the top, sides and bottom of display 300. Additionally, a color light band 502 may surround the gaming machine display 300. The color light band 502 may be synced to the main game base color 401 and the main game feature color 403. The color light band may also be synced to the jukebox lobby color 405.

Figure 9:
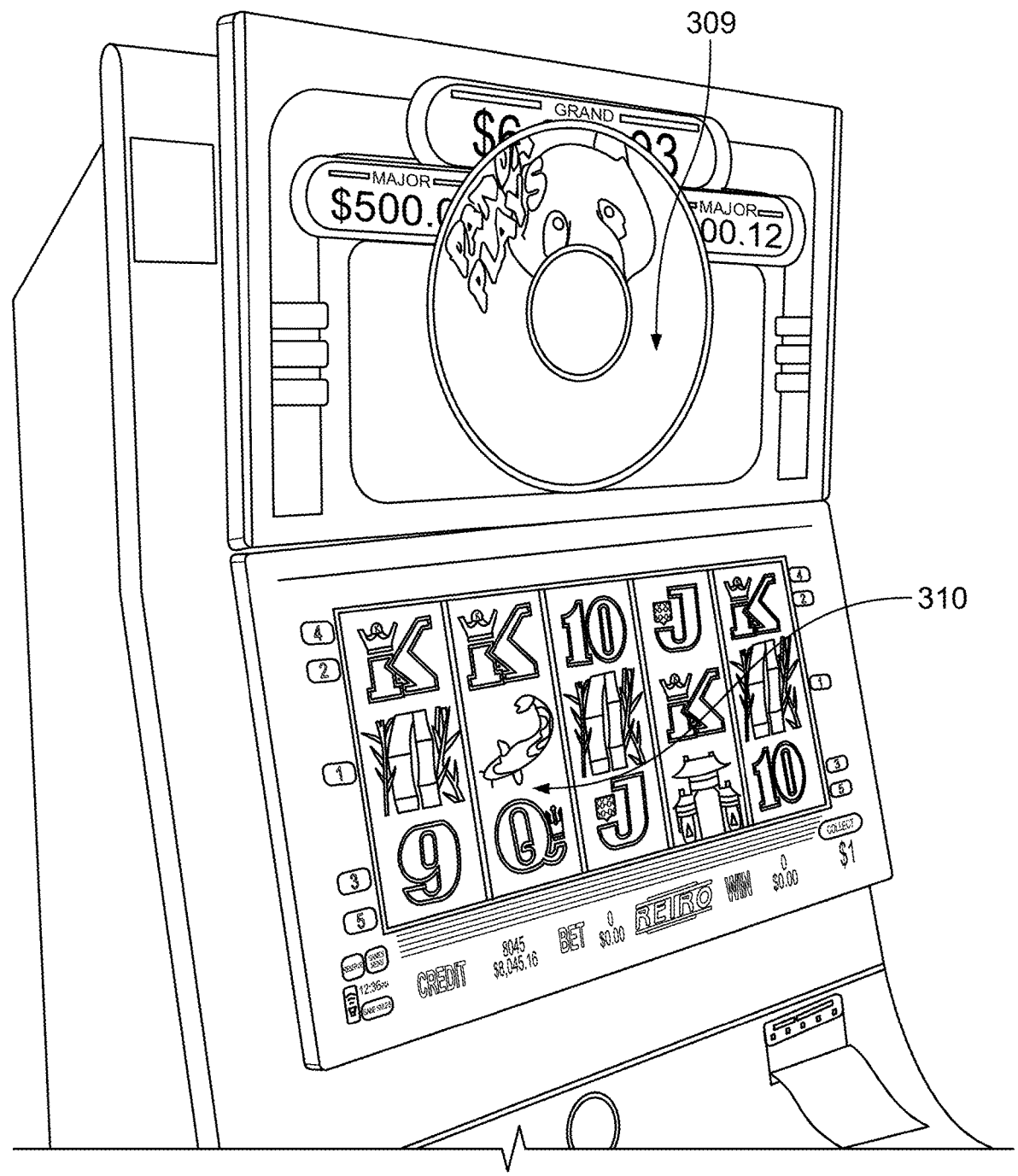
FIG. 9 is a mockup showing a game CD being loaded and spinning
Figure 10:
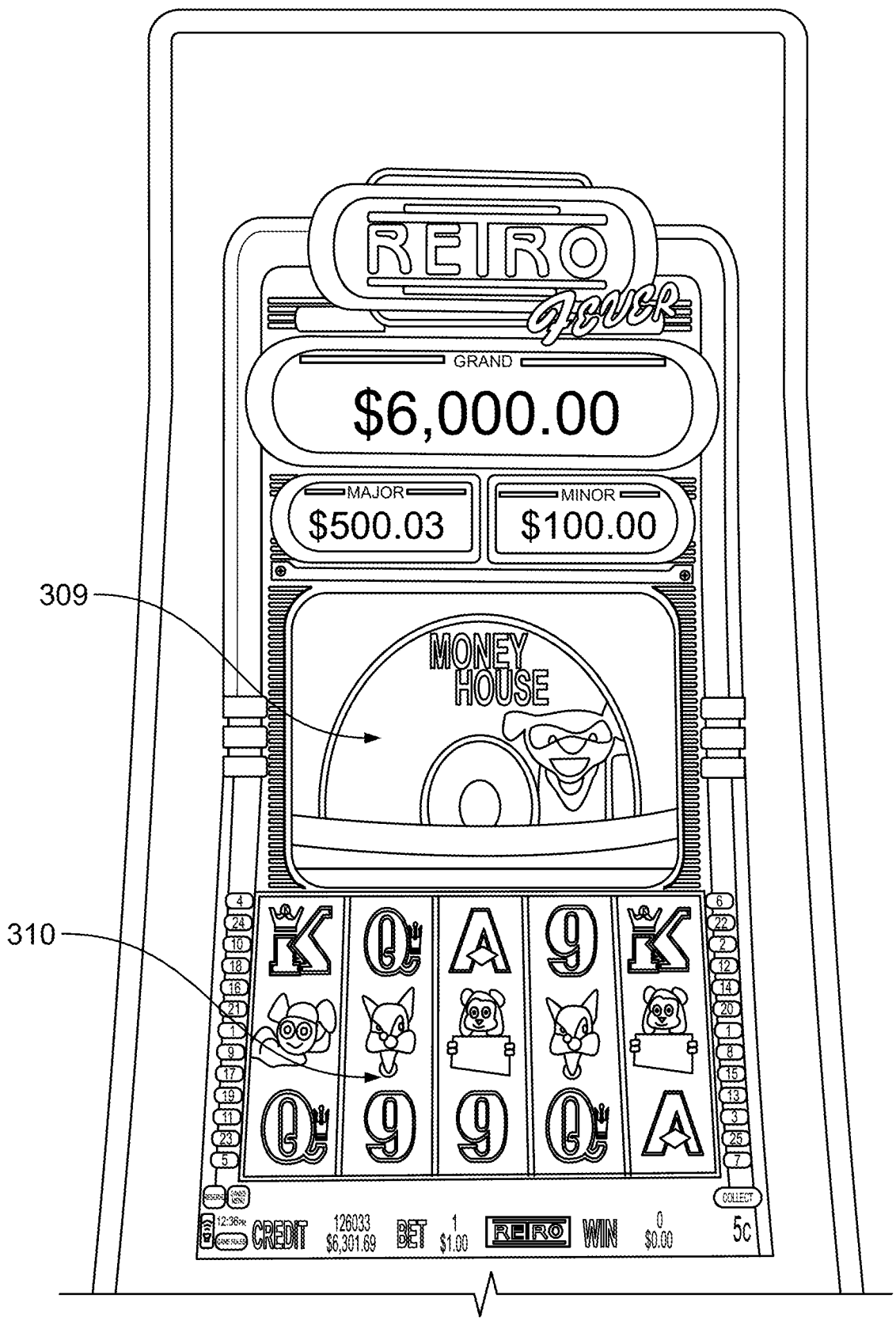
FIG. 10 is a main game loaded and ready to play

FIG. 9 shows the gaming system loading a main game once the player has selected a game CD 305 from the jukebox lobby display screen 405 (for example in FIG. 6). Upon selection, the case of the game CD 305 is opened, and the disk 309 emerges and begins to spin. Disk 309 comes to a stop, and the player may play the main game in the main game play section 310 below the disk 309. Persons skilled in the art would appreciate such a described CD spinning visual effect would provide players with additional amusement. FIG. 10 shows the disk 309 at its resting position once a main game is loaded. The disk 309 may display the name and or images relating to the main game in the main game play section 310.

Figure 11:
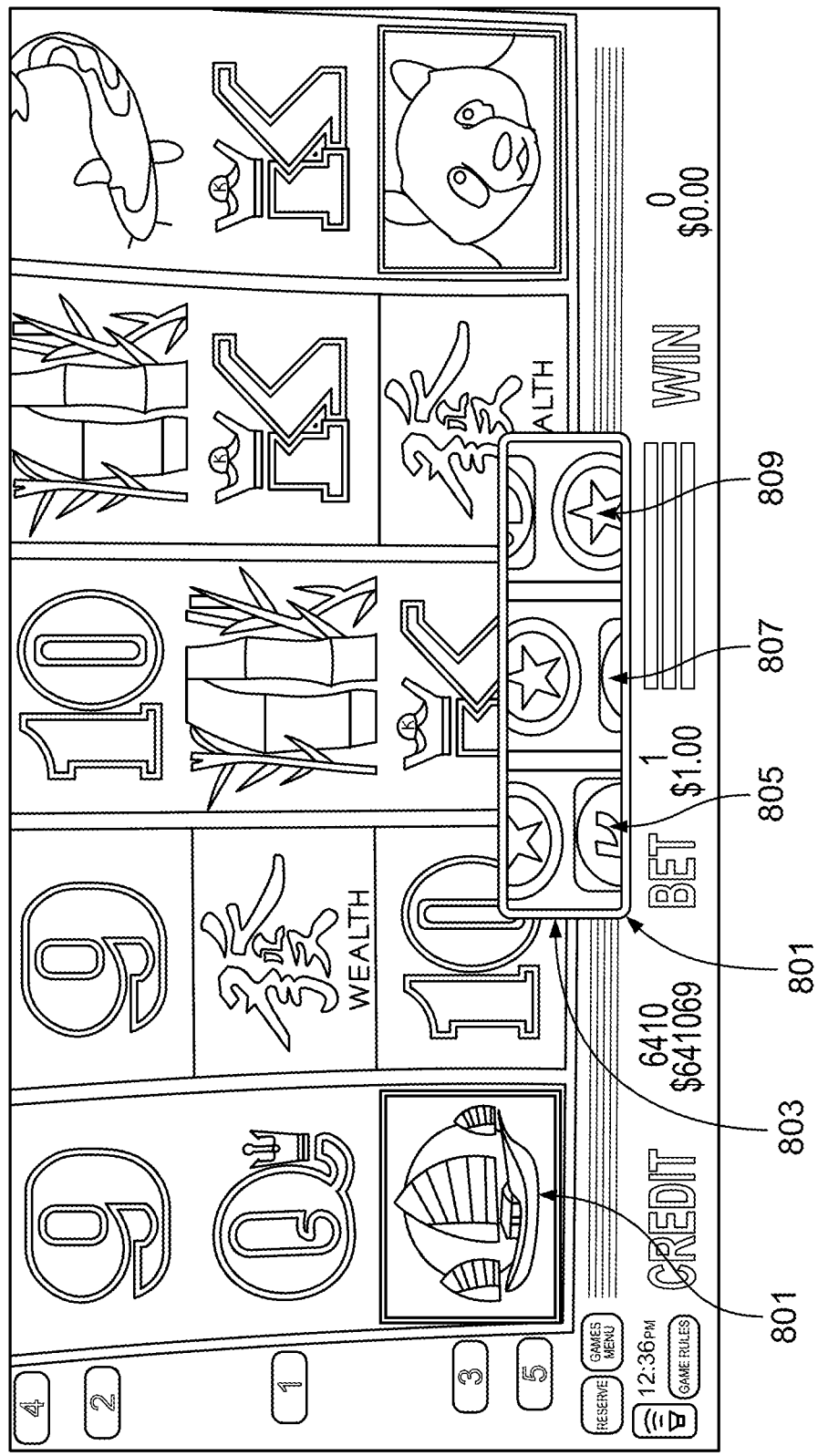
FIG. 11 is a mockup of the bonus trigger spin initiating
Figure 12:
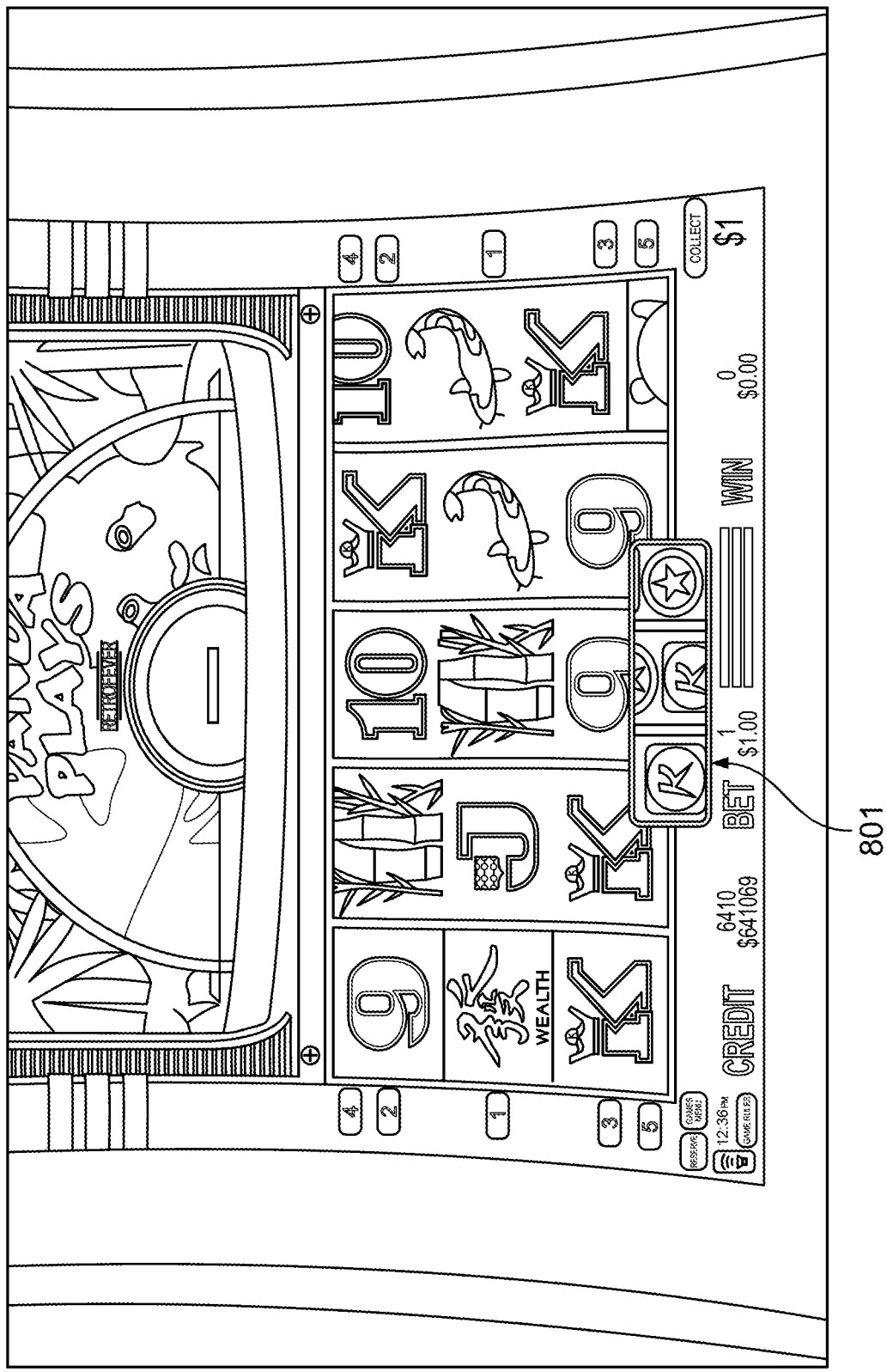
FIG. 12 is a is a mockup of the bonus trigger spin mid spin
Figure 13:
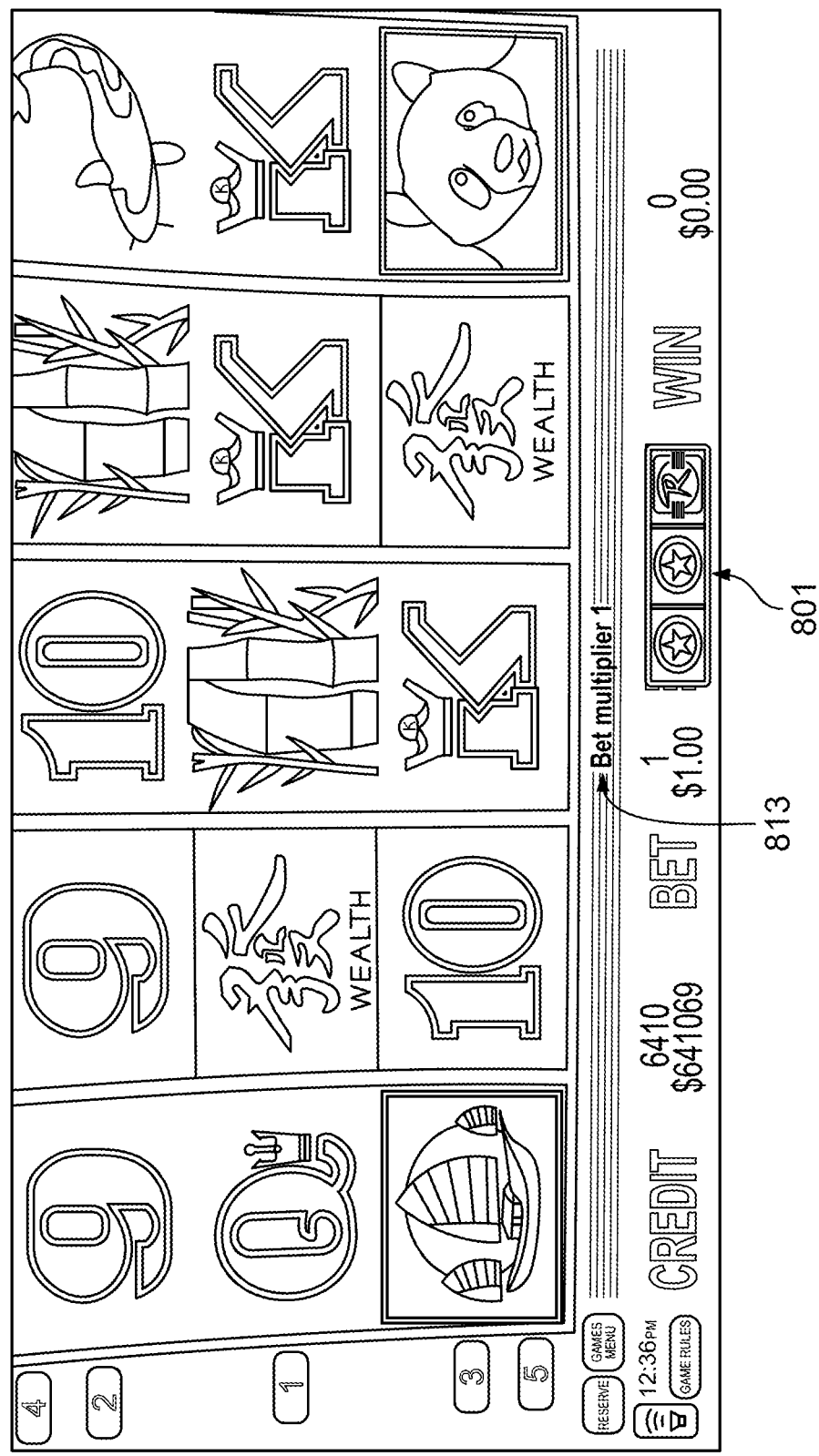
FIG. 13 is a mockup of the bonus game trigger spin losing out come
Figure 14:
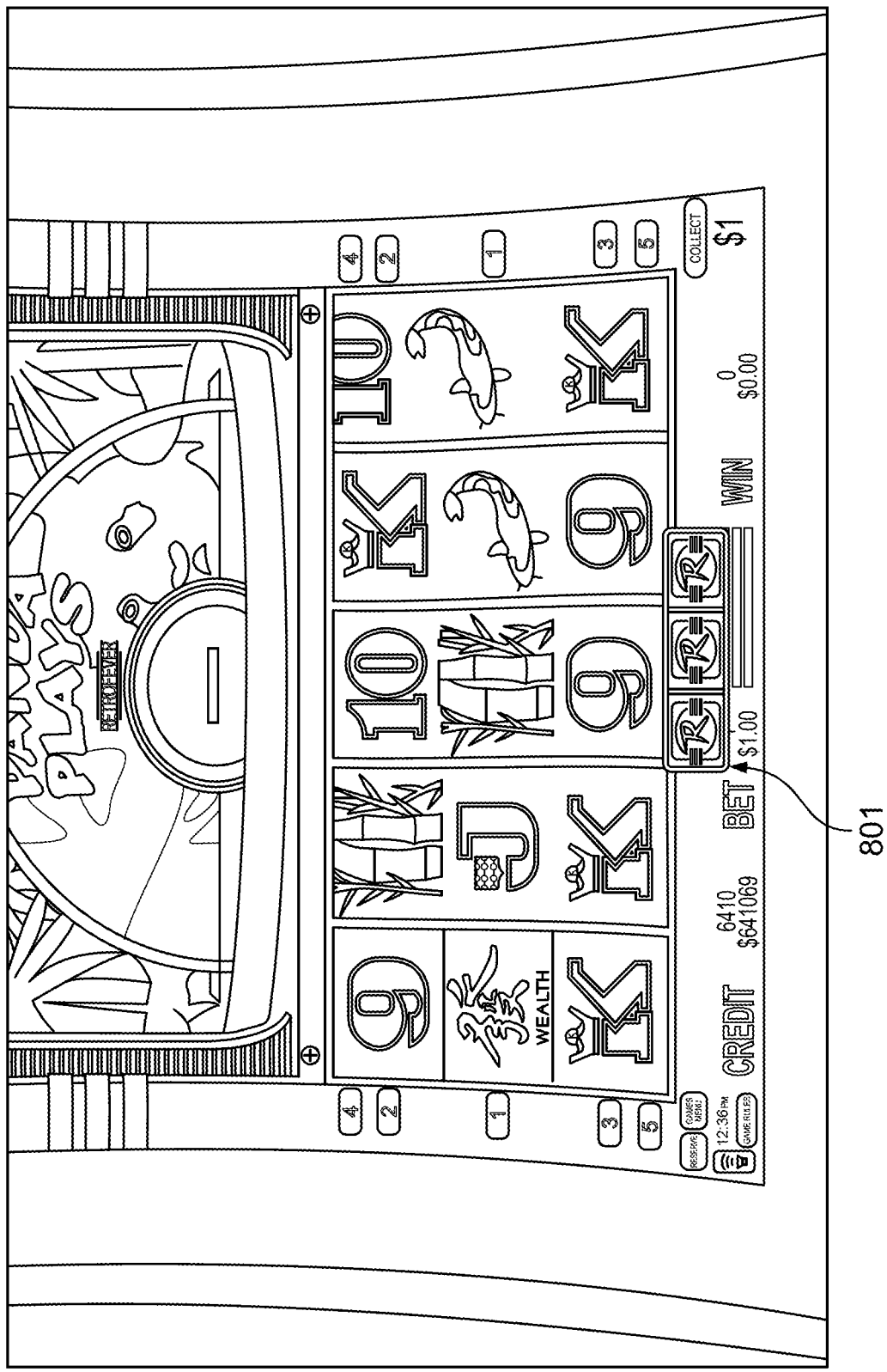
FIG. 14 is a mockup of the bonus game trigger spin winning outcome

During game play of any of the games, a bonus feature game of a second single line slot game may develop from logo 304 (FIG. 6). Logo 304, having the word RETROFEVER or RETRO, will transform into a 3-reel, single line game display 801, as shown in FIG. 11. Game display 801 is formed of three reels 805, 807, 809. Thereafter, the three reel display 801 will move upwardly on the display screen from its original position at the bottom of the display screen, and expand into a larger form as it moves upwardly and eventually will stop in a display area 803. Display area 803 may be positioned on the screen to overlay a portion of the previous selected game, as shown in FIG. 11. The three reels 805, 807, 809 will spin and come to a stopped position to display an outcome. One outcome of three R symbols, which is a winning outcome, is shown in FIG. 14, and another outcome of one R symbol, which is a losing outcome, is shown in FIG. 13. As shown in FIG. 14, if the outcome results in a winning outcome, a jackpot reel game is played. By contrast, as shown in FIG. 13, if the outcome results in a losing outcome, the single line game display 801 will return to the original location of the logo 304. Rather than reverting to the logo 304, the single line game display 801 will remain showing the winning outcome needed to advance to the jackpot reel game. In another embodiment, the displayed outcome may relate to a bet multiplier 813, shown in FIG. 13.

Figure 15:
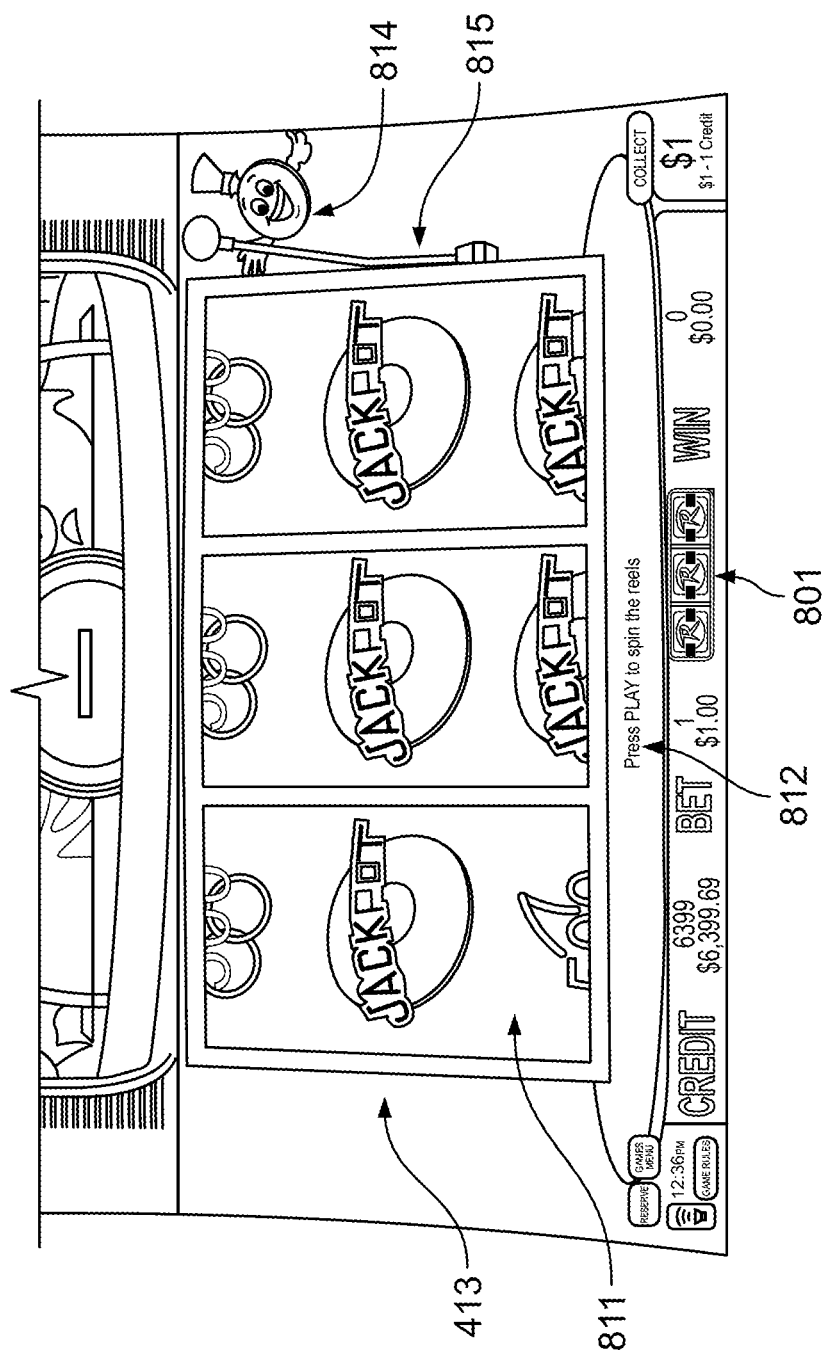
FIG. 15 is a mockup of a jackpot bonus game screen
Figure 16:
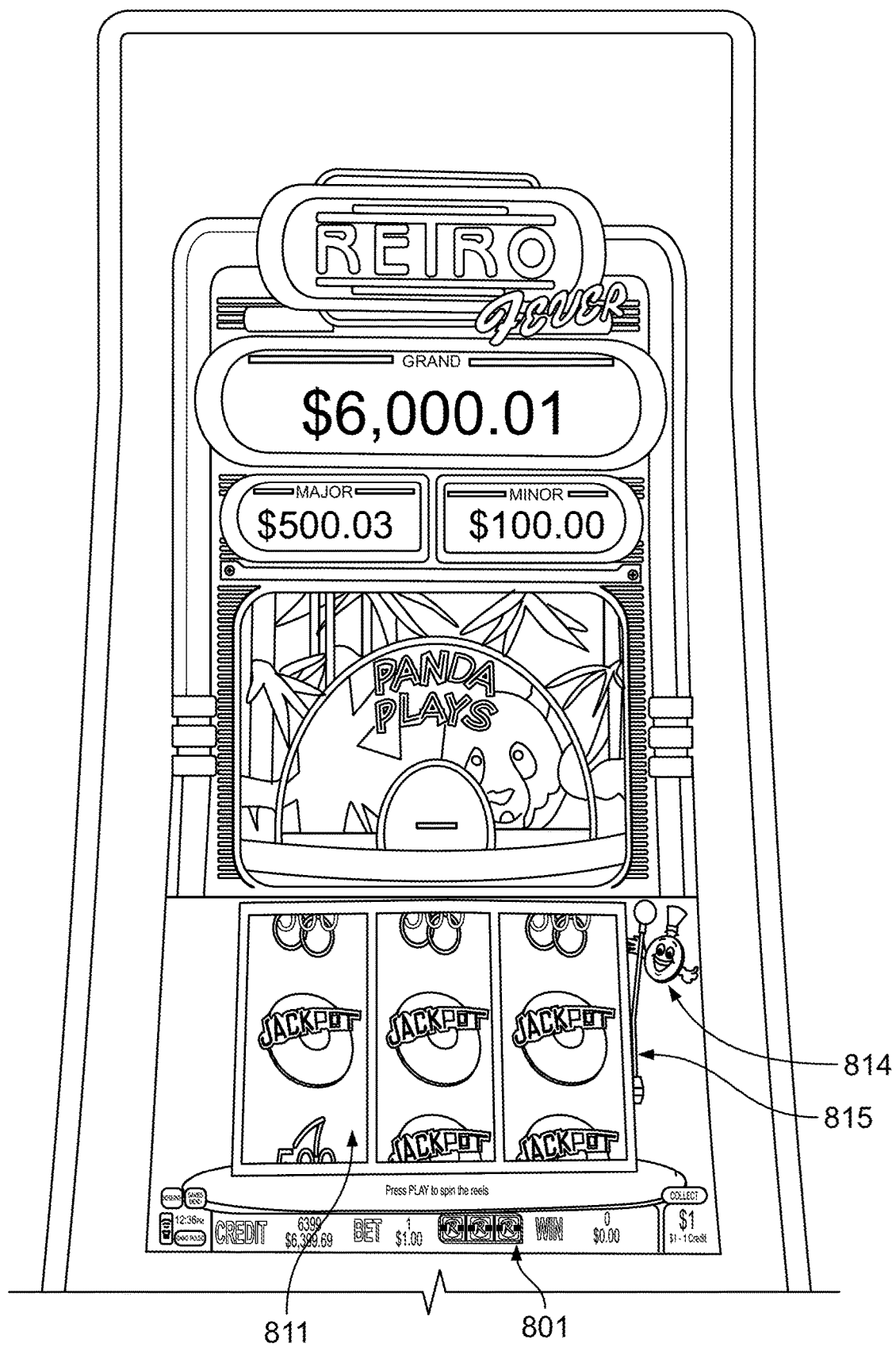
FIG. 16 is a mockup of a winning jackpot bonus game screen

As shown in FIGS. 15 and 16, the three reel single line game display 801 will revert back to its original size and be displayed again but showing the winning outcome. The jackpot game will then be presented onto display 413 as a slot game. As shown in FIGS. 15 and 16, three game symbol reels 811 will appear on the screen display 413, and reels 811 will begin to spin and then stop, to provide the player with an outcome for a chance at a jackpot prize. As shown in FIG. 15 the starting position of reels 811 may be arranged in a winning combination. Persons skilled in the art would appreciate that such a starting position could provide player with information as to what winning outcome is needed—i.e., three jackpot symbols.

The bonus jackpot game as shown in FIGS. 15-16 may feature a Mr. Cashman animation 814 which is shown pulling a lever 815. The Cashman jackpot may additionally include visual instructions 812 to the player "Press PLAY to Spin the Reels". The jackpot game is initiated by the player pressing a play button on the gaming machine console to cause the reels 811 to spin. Upon pressing the play button, Mr. Cashman animation 814 may be seen pulling lever 815, after which the reels 811 spin and stop.

In one embodiment, common progressive jackpot pools may be awarded as a result of the bonus feature game. Thus, the same bonus game could be used across a variety of main games or multigame packs. For example, each main game could include a number of Mr. Cashman 814 features. Persons skilled in the art would appreciate that a gaming system having a series of bonus game features that are common across multiple main games, provides for a more integrated gaming system and experience.

The bonus feature game is common to all selected main games, and so its theming will relate to the Retro Fever jukebox as a whole rather than the particular player selected main game. Therefore, the bonus game may use a different symbol and color than the main game.

In one embodiment, the bonus feature game is a spinning reel type game. The spinning reel game simulates the rotation of a number of spinning reels preferably from three to five, each spinning reel carrying a series of images or symbols. Persons skilled in the art will appreciate that the bonus feature game may not be a spinning reel game. Persons skilled in the art will appreciate that the main game need not be a spinning reel game, but could be a dice game, a card game etc.

In one embodiment, the bonus feature game occurs only when a trigger condition is met. The trigger condition is randomly triggered independent of the main game, and is the same regardless of the main game chosen. Also, there may be a wait period of time before the single line game is triggered. Persons skilled in the art will appreciate that the main game is carried out each time the player makes a wager. In a second embodiment, the bonus feature game is randomly triggered dependent on the outcome of the main game. Again, the gaming system may be adapted to wait until there is a pause in the main game before the bonus feature game is displayed. In a third embodiment, the trigger may be certain actions in the jukebox lobby. For example, the trigger may occur when the player selects one of the games a predetermined number of times.

While the disclosure has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the claims.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A gaming machine comprising:
a display including a first display area, a second display area, and a third display area; and
a game controller comprising a processor and memory, the memory storing program code including instructions, the game controller executing the instructions which cause the game controller to, at least:

display on the first display area a carousel of first representations of a plurality of games and display on a second display area second representations of the plurality of games;

in response to receipt of a first input, display a rotation of the first representations in the carousel in the first display area;

display a plurality of selectable denominations in the third display area; and in response to receipt of a second input with respect to a selected representation of the first representations in the carousel, highlight a second representation of the second representations corresponding to the selected representation.

2. The gaming machine as claimed in claim 1, and in response to having received a third input with respect to the third display area corresponding to selection of a denomination of the plurality of selectable denominations, initiate a game corresponding to the highlighted second representation and the selected denomination.

3. The gaming machine as claimed in claim 1, further comprising a user interface operable to receive the first input and the second input.

4. The gaming machine as claimed in claim 1, and wherein the display is a touch screen display operable to receive the first input and the second input.

5. The gaming machine as claimed in claim 1, further comprising a credit input mechanism operable to receive a credit input representing a monetary value for establishing a credit balance.

6. The gaming machine as claimed in claim 5, and wherein the credit input mechanism comprises one or more of a card reader for reading a smart card, debit card or credit card, a coin input chute, or a bill collector.

7. The gaming machine as claimed in claim 1, wherein the game controller is further operable to execute instructions which cause the game controller to initiate a game of the plurality of games corresponding to the selected representation.

8. The gaming machine as claimed in claim 1, and wherein each of the plurality of selectable denominations includes a credit value.

9. A gaming machine comprising:
a display including a first display area, and a second display area; and
a game controller comprising a processor and memory, the memory storing program code including instructions, the game controller executing instructions which cause the game controller to, at least:
display on the first display area a carousel of first representations of a plurality of games and display on the second display area a plurality of selectable denominations;
in response to receipt of a first input, display on the first display area a rotation of the carousel and highlight a first representation of the first representations of the carousel; and
in response to receipt of a second input corresponding to selection of a denomination of the plurality of selectable denominations, initiate a game corresponding to the highlighted first representation and the selected denomination.

10. The gaming machine as claimed in claim 9, wherein the display further comprises a third display area operable to display a list of second representations of the number of the plurality of games.

11. The gaming machine as claimed in claim 10, and, in response to the first input, highlight a second representation of the second representations in the list on the third display area.

12. The gaming machine as claimed in claim 9, and wherein each selectable denomination of the plurality of selectable denominations defines a corresponding credit value.

13. The gaming machine as claimed in claim 9, and wherein the selected denomination corresponds to a betting amount for the game.

14. A method of playing a game on a gaming machine comprising a display including a first display area, a second display area, and a third display area, and a game controller comprising a processor and memory, the memory storing program code including instructions, the method comprising:
displaying on the first display area a carousel of first representations of a plurality of games;
displaying on the second display area a list of second representations of the plurality of games;
in response to receipt of a first input at the second display area, highlighting one representation in the second display area and highlight a corresponding another one representation in the first display area; and
in response to receipt of a second input at the third display area corresponding to a denomination of a plurality of selectable denominations, initiating a game corresponding to the highlighted one representation.

15. The method of playing a game as claimed in claim 14, wherein each selectable denomination is surrounded by a touch actuable area.

16. The method of playing a game as claimed in claim 14, and wherein a number of available credits is based on a credit balance and a selected denomination.

17. The method of playing a game as claimed in claim 14, and in response to the second input, removing the first representations from the first display area and removing the second representations from the second display area.

18. The method of playing a game as claimed in claim 17, and in response to removal of the first representations of the first display, displaying a game compact disk associated with the selected game on the first display area.

19. The method of playing a game as claimed in claim 17, and in response to removal of the second representations of the second display, displaying a game display screen associated with the selected game on the second display area.

20. The method of playing a game as claimed in claim 14, wherein the list of the second representations is displayed as a matrix, and wherein the input comprises a tapping of a second representation of the second representations in the matrix.

* * * * *